(12) United States Patent
Wilhelm et al.

(10) Patent No.: US 6,675,434 B1
(45) Date of Patent: Jan. 13, 2004

(54) WIPER BLADE FOR THE GLASS SURFACES OF MOTOR VEHICLES WITH AN ELONGATED, SPRING-ELASTIC SUPPORT ELEMENT

(75) Inventors: Manfred Wilhelm, Eberdingen (DE); Thomas Kotlarski, Buehlertal (DE); Julius Mazurkiewicz, Diest (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/763,070

(22) PCT Filed: Jun. 30, 1999

(86) PCT No.: PCT/DE99/01880

§ 371 (c)(1),
(2), (4) Date: Feb. 16, 2001

(87) PCT Pub. No.: WO01/02224

PCT Pub. Date: Jan. 11, 2001

(51) Int. Cl.[7] .............................. A47L 1/02; B60S 1/02
(52) U.S. Cl. .............................. 15/250.454; 15/250.43
(58) Field of Search ................. 15/250.43, 250.44, 15/250.451, 250.452, 250.453, 250.454

(56) References Cited

U.S. PATENT DOCUMENTS

| 3,427,637 A | 2/1969 | Quinlan |
| 3,785,002 A | 1/1974 | Quinlan et al. |
| 4,360,943 A | 11/1982 | Thompson |
| 5,052,072 A | 10/1991 | Chen |

FOREIGN PATENT DOCUMENTS

| DE | 196 50 159 A | 6/1998 |
| DE | 198 02 451 A | 7/1999 |
| EP | 0 646 507 A | 4/1995 |

Primary Examiner—Terrence R. Till
(74) Attorney, Agent, or Firm—Michael J. Striker

(57) ABSTRACT

In a wiper blade (10) a termination part (26 or 126 or 232 or 326) which covers each end of the wiper blade (10) has a base body (28), located on the side remote from the window (18) and bracing itself on the wiper blade (16, 20) which base body is provided with hook-like extensions (30 or 330) that cross the support element (126) on both of its long sides and engage the side of the support element toward the window from behind; if at least one detent shoulder (36 or 132) pointing toward the other end portion is disposed oh each of the two end portions of the support element, and a counterpart shoulder (38 or 134) present on the termination part is associated with the detent shoulders; and if furthermore at least one of the two shoulders and/or at least one of the two extensions is elastically deflectable.

13 Claims, 4 Drawing Sheets

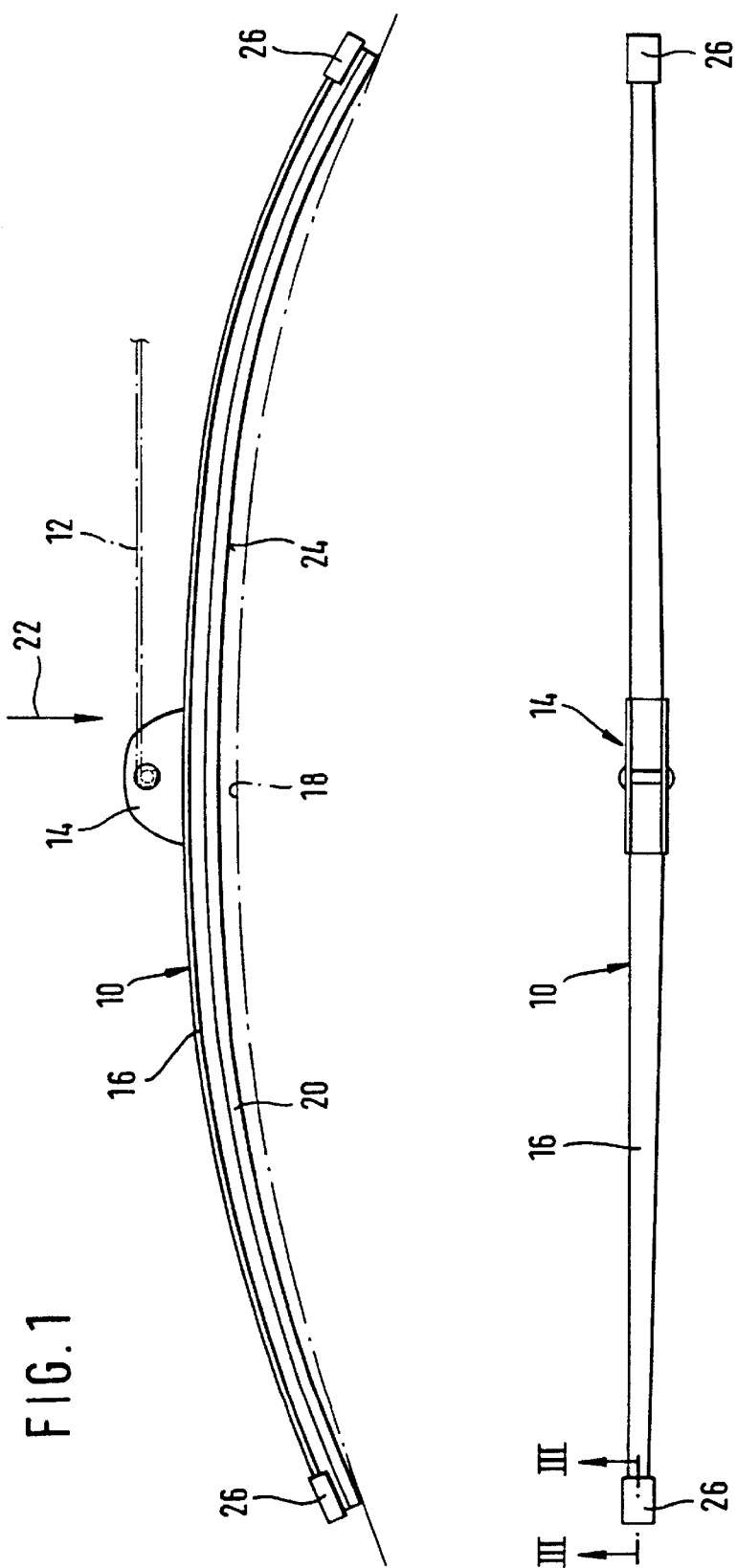

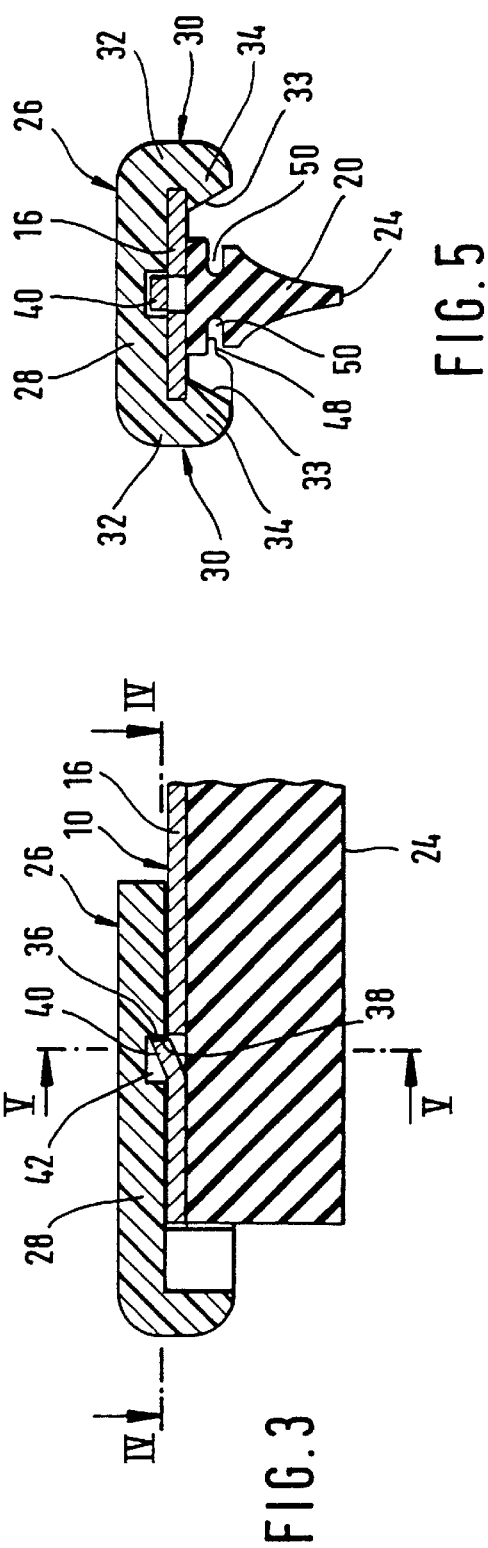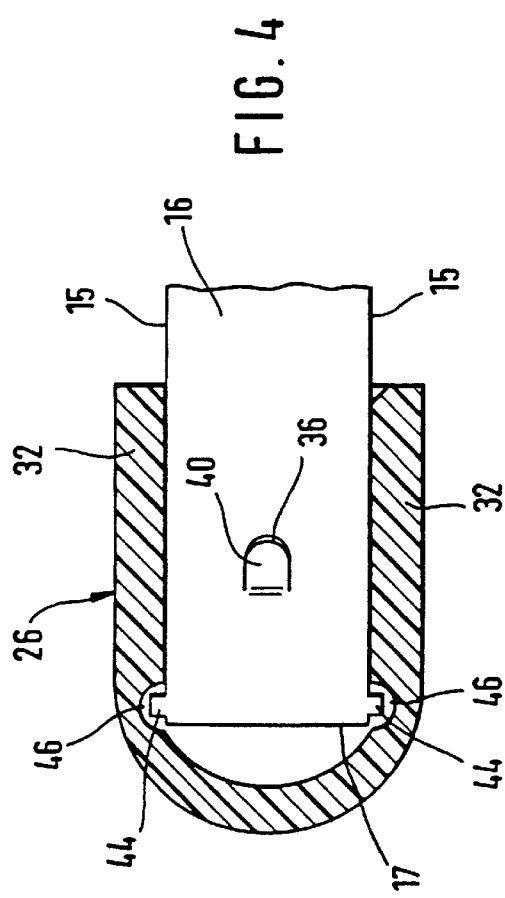

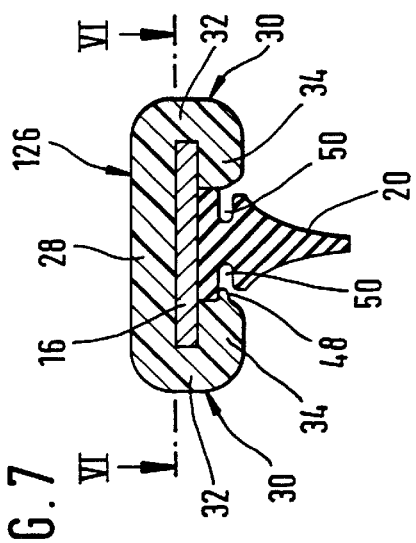
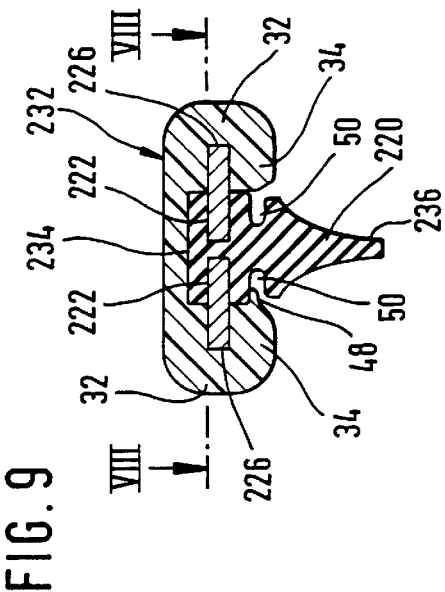
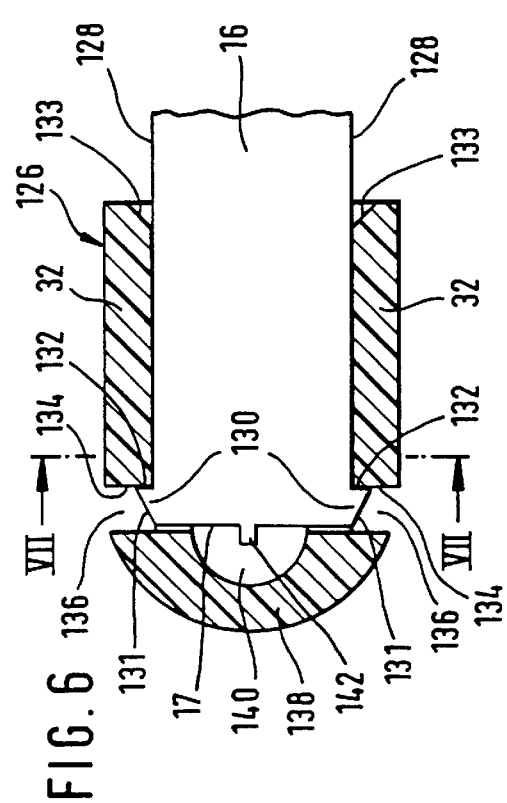
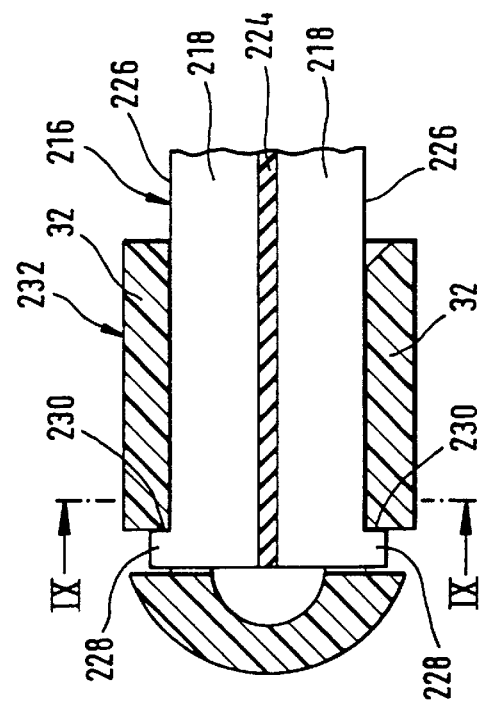

WIPER BLADE FOR THE GLASS SURFACES OF MOTOR VEHICLES WITH AN ELONGATED, SPRING-ELASTIC SUPPORT ELEMENT

BACKGROUND OF THE INVENTION

In wiper blades, the support element is meant, over the entire wiping field swept by the wiper blade, to assure that most uniform possible distribution of the wiper blade contact pressure against the window or glass, which pressure originates in the wiper arm. By element—that is, when the wiper blade is not resting against the window—the ends of the wiper strip, placed entirely against the window during operation of the wiper blade, are urged toward the window by the then-tensed support element, even if the radii of curvature of spherically curved vehicle windows change at each wiper blade position. The curvature of the wiper blade must accordingly be somewhat greater than the maximum curvature measured in the wiping field of the window to be wiped. The support element thus replaces the complicated support bracket construction with two spring rails disposed in the wiper strip of the kind used in conventional wiper blades (German Published, nonexamined Patent Application DE-OS 15 05 357).

The invention is based on a wiper blade as generically defined by the preamble to claim 1. In a known wiper blade of this type (U.S. Pat. No. 3,785,002), a shield-like termination part is disposed on each of its two end portions; with a comparatively long tongue, it rests on the top side, remote from the window, of the support element that is constructed of two leaf springs one above the other, and for securing the mounting position in the longitudinal direction, it has a cam that engages a recess of the upper leaf spring. Crosswise to the length of the wiper blade, the position securing is effected by means of a tunnel-like embodiment of the wiper strip on its two end regions that surround the support element together with the tongues of the two termination parts. The thus-fixed termination parts completely cover the ends of the wiper strip in the region of the sharp-edged support element. The design of the known wiper blade requires cost-intensive production processes both for the wiper strip and for the support element and the termination parts. Mounting the known wiper blade furthermore requires a plurality of mounting steps that can be done only by hand. Finally, the tongues of the termination parts stiffen the ends of the support element, which—especially in the case of spherically curved windows—has an unfavorable effect on the desired uniform distribution of contact pressure of the wiper strip against the window.

SUMMARY OF THE INVENTION

In the wiper blade according to the invention, the termination part can be embodied as short enough that no impairment of the elasticity of the support element occurs. The wiper strip can have a constant cross section over its entire length, and thus it can be produced economically by extrusion. Mounting the two termination parts is also done in a simple way by snapping them onto the support element or onto the already preassembled wiper blade, with the wiper strip retained on the support element. This snapping action can also be done by means of an automatic mounting station. The termination parts thus snapped on prevent injuries to persons handling the wiper blade from the ends of the support element, which as a rule have sharp edges.

If the support element is embodied as a one-piece spring band, on one band face of which, toward the window, the wiper strip is secured, and from the other band face of which, remote from the window, the detent shoulder protrudes, the support element can be produced economically and without waste from spring band steel.

In a detent shoulder embodied in this way, it is expedient if on the side of the termination part base body toward the support element, a throat is disposed, on which the counterpart shoulder of the termination part is embodied.

In certain advantageous production methods for the support element, it can happen that some protrusions remain on the long sides of the end regions of the support element, and these protrusions make it more difficult for the termination parts to snap cleanly onto the support element. These restrictions are avoided if cavities for receiving protrusions protruding from the long sides of the support element are disposed in the hook legs, crossing the support element, of the hook-like extensions of the termination part.

In certain versions of the wiper blade, it can be advantageous if the support element is embodied as a one-piece spring band, on one band face of which, toward the window, the wiper strip is secured, and the detent shoulder is embodied on at least one of the two long sides of the support element. It is possible in this respect to provide the detent shoulder on a peripherally open, partial recess disposed laterally on the support element.

An inexpensive embodiment of the counterpart shoulder is attained if the counterpart shoulder is embodied on the hook legs of the hook-like extensions of the termination part that cross the support element.

Especially whenever the width of the support element narrows toward its two ends, it is advantageous if the detent shoulder is embodied on a detent tooth that protrudes from the long side of the support element.

In another production process for the support element, which is expedient in certain cases, it can happen that some small protrusions remain on the face ends of the support element that prevent the termination parts from being snapped onto the support element. If such a method is employed, it has proved advantageous if a recess for receiving a protrusion protruding from the face end of the support element is disposed on the inside wall, covering the face end of the support element, of the termination part.

A further embodiment of the wiper blade of the invention is distinguished in that the hook-like extensions that cross the support element and engage the side of the support element toward the window from behind are each joined by a respective film hinge to the base body of the termination part. The result is an especially simple mounting of the termination parts on the support element, because they merely have to be placed in their operating position on the support element, or on the support element already equipped with the wiper strip; after that, the hook-like extensions need merely be hinged into their securing positions.

Additional security of the connection between the support element and the wiper strip is obtained if the wiper strip, on both of its long sides, has a respective longitudinal groove, the inside of which is engaged by the claw legs, oriented toward one another and disposed on the hook legs, of the termination part.

In a further embodiment of the wiper blade, which is expedient for certain applications, the support element has two elongated, spring-elastic retaining rails, which are each disposed one of the two longitudinal grooves extending along both long sides of the wiper strip, and the retaining rails protrude with their long edges remote from one another out of their longitudinal grooves of the wiper strip, and the detent shoulder is embodied on at least one of these two long edges.

In a wiper blade constructed in this way, the counterpart shoulder of the termination part that is associated with the detent shoulder of the retaining rails are disposed on the hook-like extensions that cross the support element having the two retaining rails. Besides the simple mounting of the termination parts, the result, at no additional effort or expense, is that the two retaining rails are reliably secured in their mounting positions of the wiper strip.

The desired simplicity of fastening the termination parts to the support element or wiper blade can be achieved especially well, along with economical production, if the termination part is made from an elastic plastic.

Further advantageous refinements and features of the invention are disclosed in the ensuing description of exemplary embodiments shown in the associated drawing.

BRIEF DESCRIPTION OF THE DRAWING

Shown in the drawing are:

FIG. 1, the wiper blade of the invention in side view;

FIG. 2, a plan view on the wiper blade of FIG. 1;

FIG. 3, a longitudinal section through one end of the wiper blade, taken along the line III—III of FIG. 2, shown enlarged;

FIG. 4, a section through the arrangement of FIG. 3 taken along the line IV—IV;

FIG. 5, a cross section through the arrangement of FIG. 3 taken along the line V—V;

FIG. 6, a section as in FIG. 4 taken along the line VI—VI in FIG. 7, rotated by 90°, through a different embodiment of the invention;

FIG. 7, a section through the arrangement of FIG. 6 taken along the line VII—VII;

FIG. 8, a section as in FIG. 4 taken along the line VIII—VIII in FIG. 9, rotated by 90°, through a different embodiment of the invention;

FIG. 9, a section through the arrangement of FIG. 8 taken along the line IX—IX;

DESCRIPTION OF THE PREFERRED EMBODIMENTS

Figure 10:
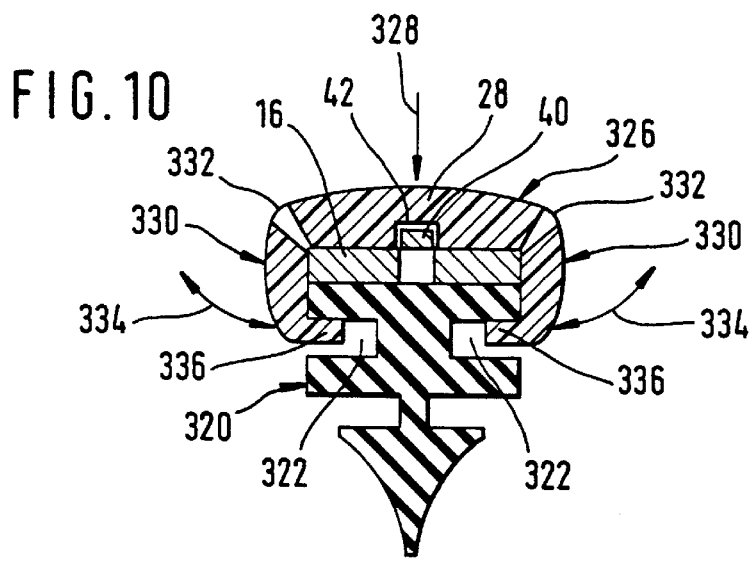
FIG. 10, a section in accordance with FIG. 5 through a further embodiment of the invention.

A wiper blade 10 shown in FIGS. 1 and 2 belongs to a wiping apparatus for motor vehicle windows or other glass. The wiper blade 10 is secured to a driven wiper arm 12, represented by dot-dashed lines, that belongs to the wiper system. To that end, it has a connection device 14, with which it is pivotably connected to the free end of the wiper arm 12. The wiper blade 10 has an elongated, spring-elastic support element 16, on one band face of which, toward a window 18 of the motor vehicle, an elongated, rubber-elastic wiper strip 20 is held longitudinally parallel, for instance being glued on. The connection device 14 for the wiper arm 12 is seated on the other band face, remote from the windshield 18, of the support element 16. The wiper arm 12 and thus the wiper blade 10 as well are urged in the direction of the arrow 22 toward the motor vehicle windshield 18, represented by dot-dashed lines in FIG. 1, against which the wiper strip 20 that belongs to the wiper blade 10 can be pressed. In this operating position, the wiper blade is displaced by the wiper arm 12 crosswise to its length over the window 18 in order to clean the surface of the window. In FIG. 1, however, the wiper blade 10 is shown in a position in which only its two ends touch the window 18. To that end—as can be seen from FIG. 1—the unstressed wiper blade is curved more sharply than the window 18. Since the greatest curvature of the window surface is shown in FIG. 1, it is quite clear that the curvature of the wiper blade 10, resting with both ends on the window 18, is greater than the maximum window curvature. Under the contact pressure (arrow 22), the wiper blade presses with its wiper lip 24, over the full length thereof, against the window. In the process, a tension builds up in the spring-elastic support element 16 that assures for a proper contact of the wiper strip or wiper lip, over its entire length, with the window 18.

The special design of the wiper blade 10 will now be described in further detail. As FIGS. 1 and 2 show, one termination part 26 is disposed on each of the ends of the wiper blade 10, and these termination parts cover the face end edges 17 of the support element 16. Especially with support elements 16 made from a spring band steel, the termination parts 26 are intended to prevent the risk of injury from the sharp-edged face ends 17 of the support element 16 in the event that the final user of the wiper blade 10 handles it improperly, for instance when replacing wiper blades.

As FIGS. 3–5 for a first embodiment of the termination part 26 show, the termination part has a substantially plate-like base body 28, which is braced against the support element 16, on its side remote from the window, or on the wiper blade 10. FIG. 5 shows that hook-like extensions 30 are disposed on the base body 28; with legs 32, they cross the two long sides of the support element 16 and engage the support element from behind with claws 34 that adjoin the legs and point toward one another. Since in this exemplary embodiment the support element 16 is wider than the wiper strip 20, the extensions 30 surround only the side regions of the support element 16. To secure the termination parts 26 to the support element 16 in the longitudinal direction of the support element, a detent shoulder 36 pointing toward the other end portion is disposed on both portions of the support element; this detent shoulder is assigned a counterpart shoulder 38 provided in the base body 28 of the termination part 26. The detent shoulder 36 of the support element 16, embodied as a one-piece spring band, is embodied on the edge, pointing toward the other support element end, of a spring tab 40 cut free on three sides sheared out of the spring band and pressed through to the band face of the support element remote from the wiper strip 20; this spring tab is not shown in section in FIG. 4. In the mounting position of the termination part 16 (FIG. 3), this spring tab protrudes into a throat 42, oriented toward it, of the base body 28, and the wall of the throat 42 toward the detent shoulder 36 forms the counterpart shoulder 38 that cooperates with the detent shoulder 36. The mounting of the termination part 26 onto the support element 16 can be achieved by slipping the termination part onto the support element 16 in the longitudinal direction of the support element. Since the termination part is made from an elastic plastic, it can temporarily deflect elastically during assembly, until it reaches its final position. It is also possible for the spring tab 40 to be made elastically resilient, so that temporarily it can deflect until it snaps into the throat 42. In certain production methods for the support element 16, it can happen that there are no protrusions 44, whose origin will be explained hereinafter, remaining on the lateral end regions 15 of the support element 16. If proper mounting of the termination parts 26 is to be possible, cavities 46 for receiving the protrusions 44 are disposed in the legs 32 of the termination part 26 that cross the support element 16. In this case, the mounting is done from above, and the hook-like extensions 30 are deflected toward the side. To that end, the claws 34 have deflection chamfers 33, which in the clipping-on process cause a deflection of the extensions 30.

In a second embodiment of the invention, shown in FIGS. 6 and 7, the termination part 126 corresponds substantially to the termination part 26 described above. FIG. 7 shows that the termination part 126 likewise has a platelike base body 26, on which hook-like extensions 30 are disposed, whose hook legs 32 cross the plane of the support element 16 and, with claws 34, engage the side of the support element or wiper blade toward the window 18 from behind. For securing the mounting position in the longitudinal direction of the wiper blade, the requisite detent shoulder is embodied on the end portions of the two long sides 128 of the support element, on the support element 16 that once again is embodied as a one-piece spring band. This detent shoulder is located on teeth 130, protruding laterally from the long sides 128 of the support element, whose edges pointing toward the other end of the support element 16 form the detent shoulders 132. The counterpart shoulders 134 cooperating with the detent shoulders 132 are formed by the walls, toward the detent shoulders 132, of transverse channels 136, which free up the hook-like extensions 30 relative to the face end 138 of the termination part 126 to allow these extensions to be deflected more easily. As FIG. 6 also shows, a recess 140 is provided in the face end 138, for receiving a protrusion 142 at the face end edge 17 of the support element 16, which protrusion remains from a particular production method for the support element 16, and whose creation will be discussed hereinafter in further detail. It is naturally conceivable in the embodiment of the invention of FIGS. 3–6 as well to provide the crosswise channel 136 instead of the cavities 46. FIG. 6 shows that the two teeth 130 of the support element 16 are provided with approach chamfers 131 that extend at an incline toward the end edge 17 and that in cooperation with oblique connection halves 133 on the legs 32 of the extensions 30 assure easy mounting of the termination parts 126, since when the termination parts are slipped onto the support element 16 in its longitudinal direction, the extensions deflect elastically automatically, until the teeth 130 enter the crosswise channels 136.

In a further embodiment of the invention, shown in FIGS. 8 and 9, the support element 216 is formed by two elongated, spring-elastic retaining rails 218. Once the wiper blade has been mounted, these two retaining rails are each located in one of two longitudinal grooves 222 present on the two long sides of the wiper strip 220. A strut 224 that forms the bottom of the respective groove remains between the two longitudinal grooves 222 in the wiper strip.

The two retaining rails 218 protrude with their two long edges 226, remote from one another, from their longitudinal grooves 222 of the wiper strip 220. Attachments 228 protruding from the long edges 226 are disposed on each end of the two retaining rails 218, and the shoulders 230 of these extensions, pointing toward the other end of the support element 216, cooperate with counterpart shoulders assigned to them of the termination part 232 when the corresponding termination part is located in the mounting position shown in FIG. 8. Since the termination part used in this embodiment corresponds substantially to the termination part 126 of the embodiment described above, it can be explained by referring to the description of the termination part 126. In a departure from the termination part 126 of FIGS. 6 and 7, the termination part 232 of FIGS. 8 and 9 is provided with a groovelike longitudinal recess 234, for receiving part of the wiper strip 220, only in the region of its base body 28; because of how the retaining rails 218 are disposed in the longitudinal grooves 222 of the wiper strip, this longitudinal recess remains on the side remote from the wiper lip 236 of the wiper strip 220. The mounting of the termination part 232 can be done in the way explained for instance in conjunction with FIGS. 6 and 7 for the proceeding exemplary embodiment. Mounting can be made still easier because the strut 224 that remains between the longitudinal grooves 222 can be deformed elastically, transversely to its length, in the course of mounting the termination parts 232. The counterpart shoulders of the termination part 232, which cooperate with the detent shoulders 230 of the extensions 228, are equivalent to the counterpart shoulders 134 of the previous embodiment.

A further embodiment of the invention, shown in FIG. 10, allows mounting of the termination part 326 in the direction of the arrow 328. In this embodiment, the support element is entirely equivalent to the support element 16 of FIGS. 3–5. In other words, it too has spring tabs 40 on its ends, and these tabs are cut out of it and pressed out of the wall face remote from the wiper strip 320. The detent shoulders 36 are embodied on these spring tabs 40 and cooperate with corresponding counterpart shoulders 38 that are disposed at the throat 42 in the base body 28 of the termination part 326. In the embodiment of FIG. 10, the wiper strip 320 is essentially as wide as the support element 16. On both of its opposed long sides, it has longitudinal grooves 322. In a departure from the embodiment of FIGS. 3–5, the hook-like extensions 330 are joined to the base body 28 of the termination part 326 by film hinges 332. The hook-like extensions 330 are also likewise freed up relative to the face end wall 138 (FIGS. 6 and 7) of the termination part, for instance by means of suitable crosswise channels 136, so that they are pivotable in the direction of the two double arrows 334. For mounting, the termination part 326 is placed in the direction of the arrow 328 onto the band face of the support element 16 remote from the window, so that the spring tab 40 of the support element 16 enters the cavity 46 of the termination part 326, whereupon the detent shoulder 36 and the counterpart shoulder 38 prevent longitudinal shifting of the termination part 326. The fastening of the termination part 326 to the wiper blade is attained and assured by means of a suitable pivoting 334 of the hook-like extensions 330, whose claws 336, becoming slightly deformed, dip into the wall facing them and are firmly held there. Although in this embodiment the hook-like extensions dip into the longitudinal grooves of the wiper strip 320, they still engage the side of the support element toward the window from behind.

It is accordingly a common feature of all the exemplary embodiments that the termination part 26 or 126 or 232 or 326 has a base body 28, braced on the wiper blade and located on the side of the support element remote from the window 18, and this base body is provided with hook-like extensions 30 or 330, crossing the support element on both of its long sides and engaging the side of the support element toward the window from behind; on each of the two end portions of the support element, there is at least one detent shoulder 36 or 132 or 230, pointing toward the other end portion, which is assigned a counterpart shoulder 38 or 134 on the termination part; and at least one of the two shoulders is elastically deflectable. The elasticity of the plastic to be used to produce the termination parts 26 or 126 or 232 or 326 should be selected such that on the one hand problem-free mounting is possible, but on the other a reliable seat of the termination parts in their mounting position is assured.

In the embodiments described in conjunction with FIGS. 3–5, 6 and 7 and 8 and 9, it can be advantageous if at least one of the claws 34, with a retaining tab 48, engages a longitudinal recess 50 present on the wiper strip 20 or 220, in order to secure the connection, which is subject to especially heavy stress, between the support element and the wiper strip on the ends of the wiper blade.

Figure 11:
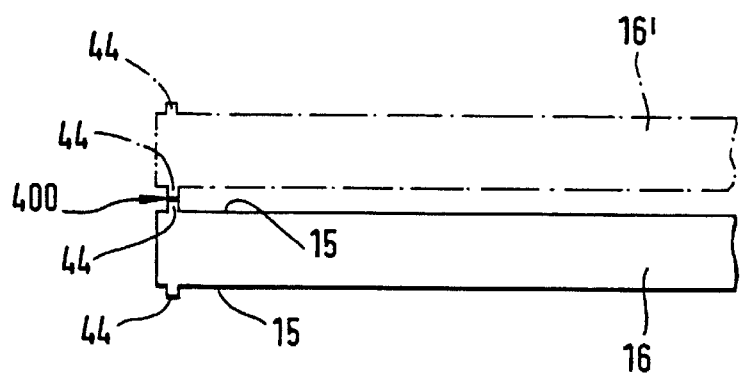
FIG. 11, a fragmentary sketch, reduced in size, of a support element belonging to the wiper blade, in order to explain one possible production method for the support element.

In one possible production method for the support element 16 (FIG. 11), this support element is cut out of a wide spring band strip, using a cutting tool. To simplify further machining of the support element 16, however, the support elements 16, 16' cut out one after the other (shown in dot-dashed lines) and subsequent ones are left hanging on one another by connecting struts 400, so that the support elements 16, 16' for instance are guided in good order through a bath for treating the support element surfaces and can then be delivered to further handling stations. Shortly before the mounting of the wiper blade, the individual support elements 16, 16' are then separated from one another by breaking the narrow connecting struts 400, as a result of which the protrusions 44 described in conjunction with FIG. 4 remain on each of the support elements.

Figure 12:
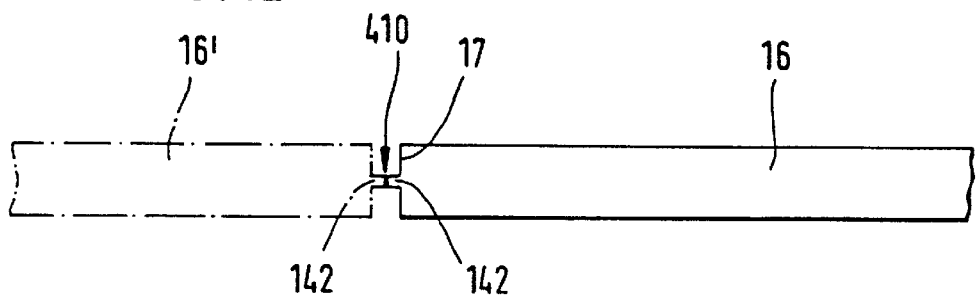
FIG. 12, a fragmentary sketch as in FIG. 11, for a different production method for the support element.

In another possible production method for the support element 16, 16' (shown in dot-dashed lines in FIG. 12), a narrow spring steel strip is guided in the longitudinal direction through a cutting tool, which cuts the support elements 16, 16' to length as needed, while letting them cohere via a narrow connecting strut 410 for the reason mentioned above. In this case as well, simple further treatment of the support elements 16, 16' thus becomes possible; before the mounting of the wiper blade, they are then separated from one another in that the connecting struts 410 are broken. The small protrusions 142 described in conjunction with FIG. 6 then remain on each support element but do not impair the function of the support element.

What is claimed is:

1. A wiper blade (10) for windows or other glass of motor vehicles, having an elongated, spring-elastic support element (16), on whose side toward the window or glass an elongated, rubber-elastic wiper strip (20) that can be placed against the window or glass is located parallel to the longitudinal axis, and on the side of the support element remote from the window or glass, in the middle portion of the support element, a device for attaching a driven wiper arm is disposed, the two ends of the wiper blade (10) each being covered by a respective termination part (26) in the region of the support element (16), characterized in that the termination part (26) has a base body (28), located on the side of the support element (16) remote from the window (18) and bracing itself on the wiper blade (16, 20), which base body is provided with hook-like extensions (30 or 330) that cross the support element (16) on both of its long sides and engage the side of the support element (16) toward the window from behind; that at least one detent shoulder (36 or 132) pointing toward the other end portion is disposed on each of the two end portions of the support element, and a counterpart shoulder (38 or 134) present on the termination part (26 or 126) is associated with the detent shoulder; and that at least one of the two shoulders (36, 132, 38, 134) and/or at least one of the two extensions (30) is elastically deflectable.

2. The wiper blade of claim 1, characterized in that the support element (16) is embodied as a one-piece spring band, on one band face of which, toward the window, the wiper strip (20) is secured, and from the other band face of which, remote from the window, the detent shoulder (36) protrudes.

3. The wiper blade of claim 2, characterized in that on the side of the termination part base body (28) toward the support element (16), a throat (42) is disposed, on which the counterpart shoulder (38) of the termination part (26) is embodied.

4. The wiper blade of claim 1, characterized in that cavities (46) for receiving protrusions (44) protruding from the long sides of the support element are disposed in the hook legs (32), crossing the support element (16), of the hook-like extensions (30) of the termination part (26).

5. The wiper blade of claim 1, characterized in that the support element (16) is embodied as a one-piece spring band, on one band face of which, toward the window (18), the wiper strip (20) is secured, and that the detent shoulder (132) is embodied on at least one of the two long sides of the support element.

6. The wiper blade of claim 5, characterized in that the counterpart shoulder (134) is embodied on the legs (32) of the hook-like extensions of the termination part (26) that cross the support element (16).

7. The wiper blade of claim 5, characterized in that the detent shoulder (132) is embodied on a detent tooth (130) that protrudes from the long side of the support element.

8. The wiper blade of claim 5, characterized in that a recess (140) for receiving a protrusion (142) protruding from the face end of the support element is disposed on the inside wall, covering the face end (17) of the support element (16), of the termination part (26).

9. The wiper blade of claim 1, characterized in that the hook-like extensions (330) that cross the support element and engage the side of the support element (16) toward the window from behind are each joined by a respective film hinge (332) to the base body (28) of the termination part (326).

10. The wiper blade of claim 9, characterized in that the wiper strip (320), on both of its long sides, has a respective longitudinal groove (322), the inside of which is engaged by the claw legs, oriented toward one another and disposed on the hook legs, of the termination part.

11. The wiper blade of claim 1, characterized in that the support element (216) has two elongated, spring-elastic retaining rails (218), which are each disposed in one longitudinal groove (222) extending along both long sides of the wiper strip; that the retaining rails (218) protrude with their long edges remote from one another out of their longitudinal grooves (222) of the wiper strip (220); and that the detent shoulder (230) is embodied on at least one of these two long edges.

12. The wiper blade of claim 11, characterized in that the counterpart shoulder of the termination part that are associated with the detent shoulder (230) of the retaining rails (218) are disposed on the hook-like extensions (32, 34) that cross the support element (216) having the two retaining rails.

13. The wiper blade of claim 1, characterized in that the termination part (26 or 126 or 232 or 326) is made from an elastic plastic.

* * * * *